United States Patent [19]

Minamida et al.

[11] Patent Number: 4,649,256

[45] Date of Patent: Mar. 10, 1987

[54] HIGH-FREQUENCY ELECTRIC RESISTANCE WELDING METHOD USING IRRADIATION WITH A LASER BEAM

[75] Inventors: Katsuhiro Minamida; Hideo Takafuji, both of Kawasaki; Hiroya Haga; Nobuo Mizuhashi, both of Sagamihara, all of Japan

[73] Assignee: Nippon Steel Corporation, Tokyo, Japan

[21] Appl. No.: 814,952

[22] Filed: Dec. 31, 1985

[30] Foreign Application Priority Data

| Jan. 10, 1985 | [JP] | Japan | 60-2444 |
| Jan. 10, 1985 | [JP] | Japan | 60-2447 |
| Jan. 11, 1985 | [JP] | Japan | 60-3000 |
| Feb. 12, 1985 | [JP] | Japan | 60-24916 |

[51] Int. Cl.$^4$ ............................................. B23K 26/00
[52] U.S. Cl. ........................ 219/121 LD; 219/121 LB
[58] Field of Search ................. 219/121 LC, 121 LD, 219/121 L, 121 LM, 121 EC, 121 ED, 121 LA, 121 LB

[56] References Cited

FOREIGN PATENT DOCUMENTS

0232676 12/1984 Japan ........................... 219/121 LD

Primary Examiner—C. L. Albritton
Attorney, Agent, or Firm—Pollock, Vande Sande & Priddy

[57] ABSTRACT

A high-frequency electric resistance welding method combined with the irradiation of a laser beam in which a workpiece is continuously fed and opposed edges of the workpiece are formed into a wedge shape by causing them to converge as they are butted against each other, and the butted edges are melted by heating them with high-frequency resistance heating and a laser beam, to weld the butted edges. The laser beam is projected against the range of over 30% and below 80% of the thickness of the butted edges including the central portion of the thickness to melt the butted edges by the combined heating action of the laser beam and high-frequency current. The corners are heated and melted by means of high-frequency electric resistance heating, so that the butted edges of the workpiece can be melted uniformly through the entire range of thickness.

5 Claims, 13 Drawing Figures

HIGH-FREQUENCY ELECTRIC RESISTANCE WELDING METHOD USING IRRADIATION WITH A LASER BEAM

BACKGROUND OF THE INVENTION (1.) Field of the Invention

This invention relates to a resistance welding method using a high-frequency current for heating edges of a workpiece to produce a weld, wherein points to be welded are irradiated with a laser beam while heating with the high-frequency electric current is continued, so that welding can be performed efficiently by relying on heating by means of the high-frequency electric current and the laser beam.

(2.) Description of the Prior Art

Welding metals is a process that has been used in many fields and there are different welding methods available. In producing tubes by welding, a high-frequency welding method is most popular.

High-frequency electric resistance welding (ERW) is known as a method of welding of high welding-speed and productivity for producing what is generally referred to as an (ERW) tube.

In the process of producing welded tubes by means of a high-frequency electric resistance welding method of the prior art, a steel strip is formed into a cylindrical shape by means of an array of forming rolls and the edges of the strip in cylindrical form are butted against each other by means of a pair of squeeze rolls, so that the edges are coverged to form a wedge shape having a vertex at the butted end.

A high-frequency voltage is applied at contacters located upstream of the squeeze rolls to supply a high-frequency current from one contact to another contact, so that a high-frequency current is allowed to flow along the edges of the wedge shape. The edges are heated by the high-frequency current until reaching a welding temperature, when pressure is applied by the squeeze rolls to form a weld.

The quality of the weld produced in this way is greatly influenced by the amount of the welding current. When the welding current is too small, the edges have a low heat input, resulting in a weld defect generally referred to as a cold weld. Conversely, when the welding current is too large and the edges have a high heat input, a weld defect generally referred to as penetrator may sometimes be produced. Insufficient heating of the edges is mainly responsible for the cold weld produced. The principal cause of the penetrator is a periodic change in the positions of the points to be welded with respect to the axis of the tube due to a large amount of molten metal produced by too high a heat input and removed from the weld by the electromagnetic force.

The problems referred to hereinabove which the method of the prior art encountered will be described more in detail. Generally, a high-frequency electric current used for producing electrically welded tubes is in the range of frequencies between 10 and 500 KHZ. The effect of heating increases with higher frequency, due to the synergisms of the "skin depth" and the "proximity effect" characteristic of a high-frequency current. This is why a high-frequency current is favored in producing electrically welded tubes.

Figure 2:
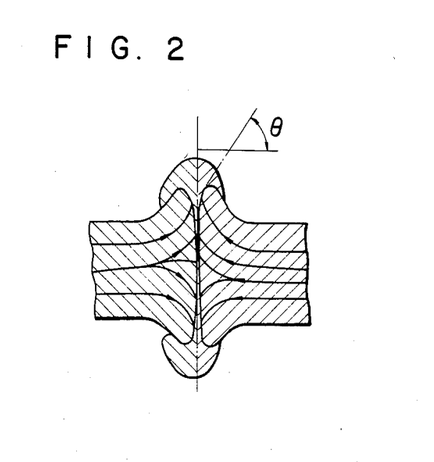
FIG. 2 is a sectional view, on an enlarged scale, of the joint produced by a high-frequency resistance welding method of the prior art.

In high-frequency electric resistance welding, edges of a workpiece are melted by being heated with a high-frequency current and at the same time an upsetting force of high magnitude is exerted on the joint by means of a pair of squeeze rolls. This process is considered to involve the mechanism that welding is achieved as the major portion of the molten metal is squeezed out of the weld to outside together with oxides produced by heating. The weld is deformed by the upset, and a metal flow rises in the heat-affected zone, as shown in FIG. 2.

Figures 3, 4:
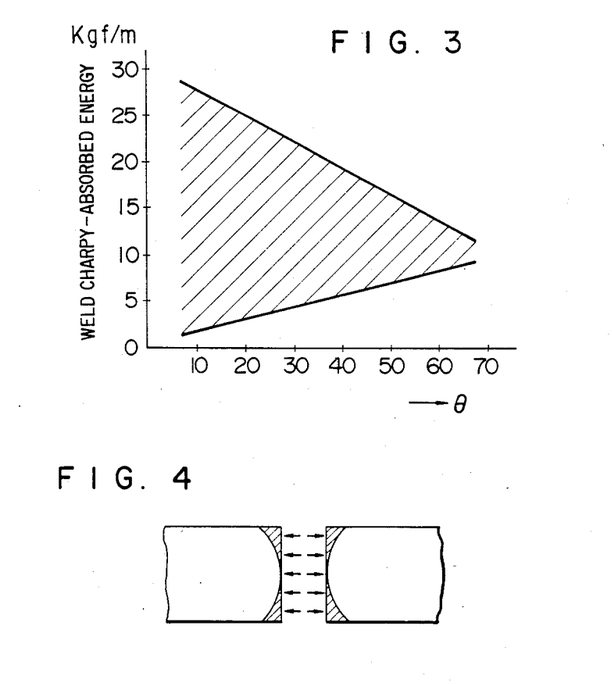
FIG. 3 is a diagrammatic representation of the relation between the rising angle of the joint shown in FIG. 2 and the toughness of the material.
FIG. 4 is a sectional view showing the condition in which the edges to be welded are melted in relation to the electromagnetic force in the method of resistance welding of the prior art.

A rise in metal flow results in a simultaneous rise in inclusions in the strip metal. This gives rise to the defect that the interior of the metal which is inferior in mechanical and chemical properties to the surface portion is exposed. Meanwhile, when no upsetting is applied, weld defects are produced. FIG. 3 shows the relation between the rising angle $\theta$ of metal flow and the toughness of the weld. The larger the rising angle $\theta$, the lower becomes the toughness. When the rising angle $\theta$ is small, toughness may show variations due to the defective weld defect, with the value of toughness dropping to an unordinarily low level. In FIG. 3, a hatched area represents the zone of toughness. Toughness varies in the hatched area. The metal flow rising angle has been considered to be acceptable when it was in the range between 50 and 70 degrees.

Figure 5A:
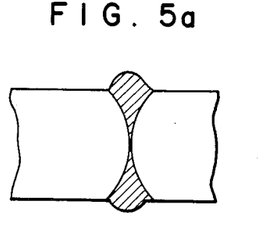
FIG. 5a is a sectional view showing the condition in which the edges are melted.
Figure 5B:
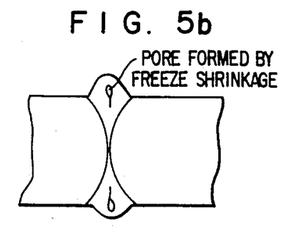
FIG. 5b is a sectional view showing the condition in which the edges are allowed to cool after being welded without upsetting.
Figure 5C:
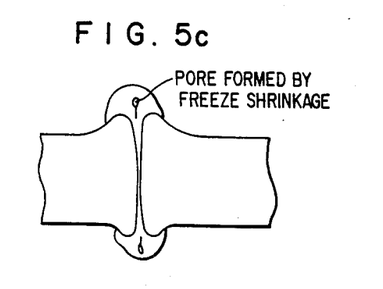
FIG. 5c is a sectional view showing the condition in which the edges are allowed to cool after being welded with upsetting.

A high-frequency current is concentrated on the surface of the edges which are butted together, particularly in the corners. Thus, the metal is melted in greater amounts in the corners than in the central portion of the butted edges. The molten metal produced at the edges is removed from the edges to outside by the action of the electromagnetic pressure induced by the welding currents. FIG. 4 shows the directions of the electromagnetic pressure, and FIG. 5a shows the shape of the butted edges immediately before welding is performed. It will be seen that each edge is convex in surface, with its central portion being protuberant. Immediately after welding is performed, molten steel fills the gap between the edges. If the molten steel were allowed to solidify in this condition or without any upsetting force being applied on the weld, pores would be produced near the corners due to solidification shrinkage of the molten steel, rendering the weld defect. FIG. 5b shows this weld defect. If an upsetting force of high magnitude were applied on the weld, the weld would be deformed into a planar shape, and the layer of solidified metal would be in the form of a thin film and no cavities would be formed due to shrinkage, as shown in FIG. 5c.

In resistance welding using a high frequency current of the prior art, an intense upsetting force should be applied to avoid the weld defects as described hereinabove. However, an intense upsetting force has given rise to the problem that the rising angle $\theta$ of the flow metal becomes large and the weld becomes lower in toughness.

This phenomenon has been observed not only in producing electrically welded tubes of straight seam but also in performing electrical resistance welding of spiral tubes.

Another reason why it has been difficult to perform welding with a low upsetting force is that the edges of the workpiece are nonuniformly melted due to nonuniform distribution of a high frequency current. It has been found that if the edges could be uniformly melted it would be possible to perform welding with a low upsetting force. It has also been found that it is in about 20% of plate thickness from the corners that the electrical current is concentrated to cause excessive melting of the steel, and that the steel is melted almost uniformly in the center range between ¼ and ¾ of plate thickness.

Meanwhile, a welding method using a laser beam or electron beam is available for producing a sound weld with a minimum heat affected zone. Proposals have been made to use the welding method in which a beam of such radiant energy is applied to the vertex of a wedge constituting a point to be welded, as disclosed for example in Japanese Patent Application No. 107120/83.

The welding process described in this document will be outlined. Edges (wedge-shaped opposed faces to be welded) of a tubular member are heated uniformly to a welding temperature through the entire range of thickness by the Joule heat generated by a high-frequency current supplied through a contact and by a laser beam applied through a beam guide from a laser unit.

The laser beam reciprocatorily scans the opposed edges of the tubular member in a predetermined range of angles with the vertex of the wedge of a predetermined angle constituting a weld point being disposed in the center. The laser beam is projected against one of the opposed edges and reflected thereby to be projected against the other opposed edge, and this reflection of the laser beam is repeated until reaching the weld point. Stated differently, even if the laser beam is not directly applied to the weld point, the beam is reflected to converge until it is automatically concentrated upon the weld point.

When this method of combined welding was used, difficulties have been experienced in achieving a predetermined heating pattern due to variations in the position which is irradiated with a laser beam caused by variations in the point to be welded stemming from variations in the thickness and strength of the material of the tubular member. It has been found that this phenomenon significantly increases in incidence when the steel material has a large thickness. Also, the phenomenon has been found to occur when there are some problems with regard to the uniformity of steel material, setting of the position of the beam and the shape of the projected beam. The phenomenon may occur, even if the position of the beam is set correctly, due to mechanical variations in the position, particularly errors in the shape of the tubular member, variations in the position of the tubular member and variations in the position of the energy beam emitting unit.

SUMMARY OF THE INVENTION

This invention has as its object the provision of an improved method of high-frequency electric resistance welding combined with laser welding. By concentratedly applying the laser beam to a portion of the workpiece to be welded where heating and melting by means of the high-frequency current is delayed, it is possible to render the condition of melting uniform through the entire thickness of the workpiece, so that welding can be achieved accurately with a minimum upset without the risk of producing weld defect. The weld produced has a small rising angle of metal flow, so that it has a high performance as a joint. The production of defective welds due to mechanical errors or errors in positioning or setting the workpiece and welding unit can be avoided.

DESCRIPTION OF THE PREFERRED EMBODIMENT

Figure 1:
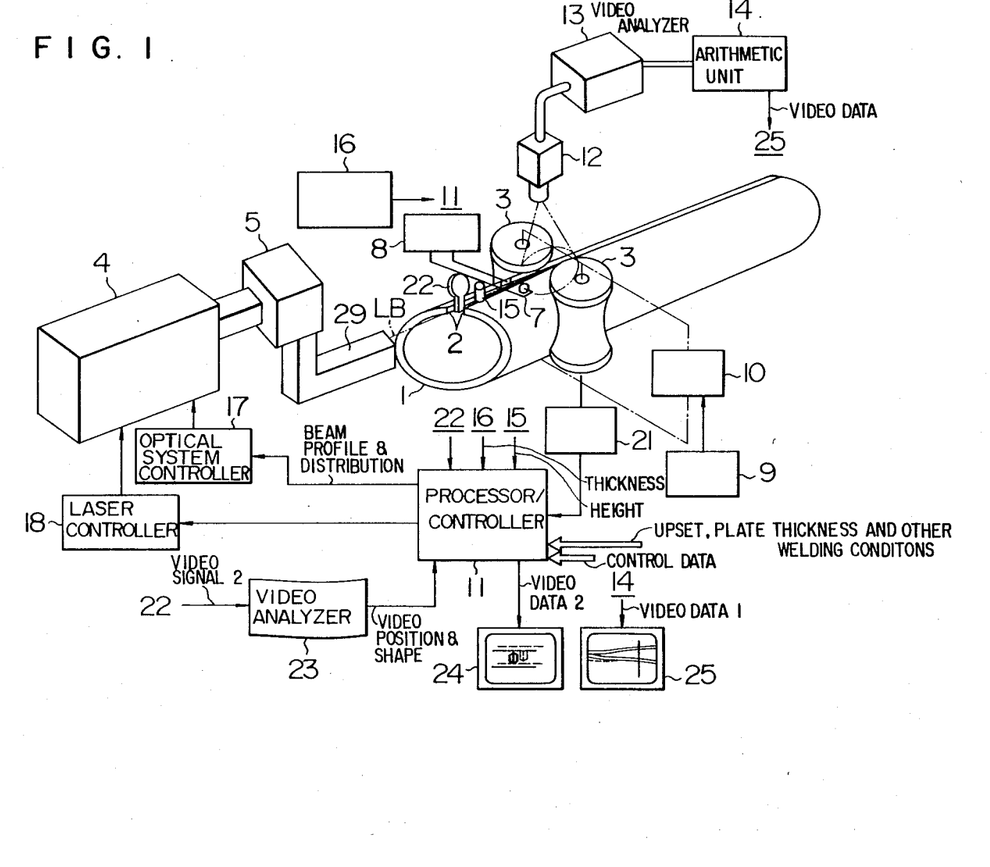
FIG. 1 is a view in explanation of a system suitable for carrying into practice the welding method according to the invention.

FIG. 1 shows a system suitable for carrying the method according to the invention into practice. A metal strip is formed into a cylindrical shape 1 and its opposed edges 2 are butted against each other. A high-frequency current is passed from a high-frequency current source 8 via contacter 7 to the edges 2, and a laser beam LB is supplied from a laser unit 4 via a beam guide 29 and a beam profile controller 5 comprising an astigmatic mirror, an ordinary mirror and a lens to the edges 2, so that the edges 2 are heated by the Joule heat generated by the high-frequency current and irradiated by the laser beam LB to be uniformly melted through the entire range of plate thickness. The laser beam LB is controlled by the laser beam profile controller 5 in such a manner that it irradiates a range of over 30% and below 80% of the plate thickness of the butted edges including the center of the plate thickness. The numeral 3 designates a pair of squeeze rolls for applying a predetermined pressure to the cylindrical shape 1 as a hydraulic cylinder 10 is actuated by a command given by a pressure controller 9 operating based on the results of calculation done by a processor/controller 11 in accordance with the strength and plate thickness of the cylindrical shape 1, the profile of the final product (diameter of tube) and the target metal flow rising angle (below 40 degrees).

Information listed below is inputted to the processor/controller 11:

Welding speed data (from a speedometer 21).
Upset data, plate thickness data, height data and other welding condition and control data.
Actual plate thickness data (from a thickness sensor ($\gamma$ ray thickness meter) 16).
Actual height data (from a height sensor 15).
Groove center line deviation data $\Delta C$ (from an arithmetic unit 14).
A required beam irradiation width $W_{LH}$ (from the arithmetic unit 14).
Actual beam position and actual beam profile (from a video analyzer 23).

Figure 6:
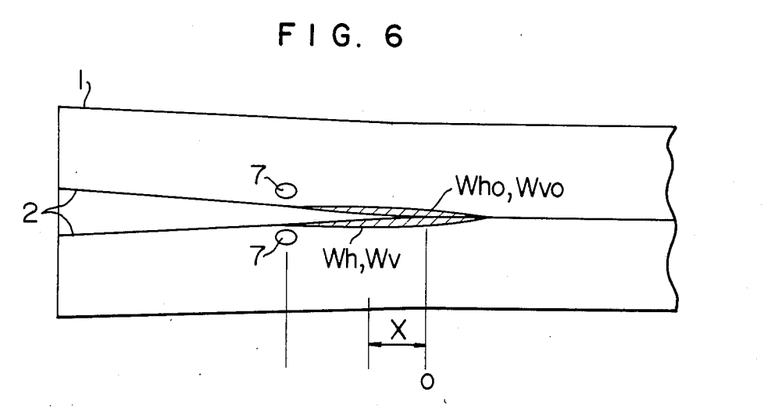
FIG. 6 shows a model of the wedge constituted by the edges of a workpiece which is being heated by a high-frequency current.

A video camera 12 having a high sensitivity in the infrared region is located and produces on its cathode ray tube an optical image of the butted edges in a position which is anterior to a welded point 0 by a predetermined distance x (see FIG. 6) and feeds a video signal to a video analyzer 13 which calculates a melt width Wh of each corner of the edges 2 anterior to the welded point 0 by the predetermined distance x based on the video signal and supplies a mean value of Wh to the arithmetic unit 14 which receives beforehand groove center line position data (data on the center line of the wedge). The arithmetic unit 14 does calculation on the deviation of the actual groove center line given by the optical image from the groove center line data stored therein, to produce deviation data $\Delta C$ which is fed into the processor/controller 11. The arithmetic unit 14 further feeds, to a CRT display unit 25, digital image data in which groove center line image data and melt measuring position indicating line image data produced from the groove center line data and position x data supplied thereto beforehand overlap digital image data received from the video analyzer 13. The CRT display unit 25 indicates on the screen of the cathode ray tube the groove center line (a dotted line extending horizontally in a block 25 in FIG. 1) which has been supplied thereto.

The height sensor 15 and a beam position and profile sensor 22 are located in such a manner that the laser beam LB is not blocked in a space of a wedge shape, and the thickness sensor 16 is located in a flat plate section. The sensors 15 and 16 defect the height of the upper surface of the tubular shape 1, projected position and profile of the laser beam LB and the thickness below the upper surface. Detected height (actual height) data, detected thickness (actual thickness) data, detected beam position (actual position: two dimensional) data and detected beam profile (actual beam profile) data (image data) are inputted to the processor/controller 11.

Based on welding conditions including a welding speed, upset, plate thickness and other factors inputted from a business computer or an input board, the processor/controller 11 feeds beam profile data and power data to an optical system controller 17 and a laser controller 18 respectively. Also, the processor/controller 11 produces, based on the data inputted thereto, graph data in which the weld point (the vertex of the wedge) is viewed from the groove of the cylindrical shape 1 and beam projection profile data and supplies same to a CRT display unit 24. The CRT display unit 24 displays on the screen of the cathode ray tube a predetermined groove profile and a predetermined beam projection profile (shown in dotted lines in the block 24 in FIG. 1). With a suitable timing, the processor/controller 11 gives a command to start a welding operation. Thus, initial welding conditions have been set. The CRT display unit 25 displays on the screen of the cathode ray tube a melt measuring point indicating line (solid vertical line) in addition to the predetermined groove center line (dotted line).

After the welding operation has been started, the processor/controller 11 reads data obtained by actual measurements and compares same with the initially set values (initial welding conditions), to calculate a deviation (or error) and performs feedback control (correction of output indication data) in conformity with the deviation.

By heating the opposed edges 2 of the cylindrical shape 1 by means of high-frequency resistance heating and irradiation with a laser beam as described above, it is possible to melt the corners of the edges 2 by high-frequency resistance heating and the central portion of the edges 2, where heating by the high-frequency current is delayed, by the laser beam which is concentratedly projected thereagainst, so that the combined action of the high-frequency current and laser beam brings the edges 2 to a uniformly melted condition in the vicinity of the vertex of the wedge while the opposed edges butted against each other are pressed by the squeeze rolls 3. As the result the major portion of the molten metal is squeezed out of the molten metal layer which is turned into a thin layer of molten metal and solidifies in the form of a film without any shrinkage cavities. Since the pressure applied by the squeeze rolls 3 is in conformity with the strength and thickness of the cylindrical shape 1 and the profile of the end product, the metal flow rising angle is kept below 40 degrees and the welded joint obtained is high in toughness and free from defects.

Figure 7:
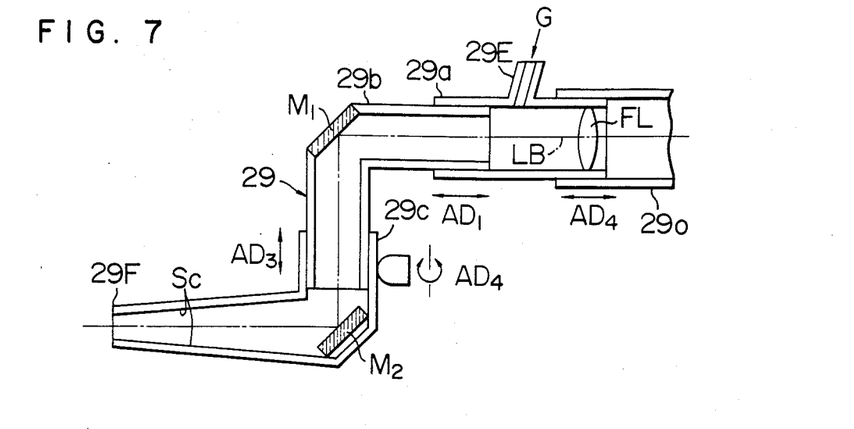
FIG. 7 is a vertical sectional view of the principal portions of the beam guide used in carrying the method according to the invention into practice.

The construction of the beam guide 29 will be described by referring to FIG. 7. The beam guide 29 comprises a focusing lens FL and transmitting mirrors $M_1$ and $M_2$. The laser beam LB is arranged to pass through the center of the focusing lens FL and be reflected by the centers of the transmitting mirrors $M_1$ and $M_2$ at all times. The beam guide 29 further comprises a wall composed of a base 29a, an intermediate portion 29b and a forward end portion 29c.

The forward end portion 29c which is substantially in the form of a letter L includes a nozzle 29F located at its forward end which is cylindrical in configuration and frusto-conical in external appearance and has an angle which is of the same degree as the angle of the wedge of the tubular shape 1. The nozzle 29F directing the laser beam LB and non-oxidizing gases has a mirror surface finish on an inner periphery and the mirror $M_2$ is mounted in the corner of the L-shaped end portion 29c which receives at its rear end a forward end of the intermediate portion 29b. The forward end portion 29c is rotatable about the forward end of the intermediate portion 29b and vertically movable in sliding movement in the directions of arrows $AD_3$.

The intermediate portion 29b is also substantially in the form of a letter L, and the mirror $M_1$ is mounted in the corner of the L-shaped intermediate portion 29b. The intermediate portion 29b which is also finished as a mirror on its inner surface includes a rear end which is inserted in a forward end of the base 29a for telescopic sliding movement in the directions of arrows $AD_1$.

The focusing lens FL is fitted to a rear end of the base 29a which is finished as a mirror on its inner surface. The base 29a is mounted at its rear end to a beam delivery guide $29_o$ of the laser unit 4 for telescopic sliding movement in the directions of arrows $AD_4$. A tubular member 29E for introducing non-oxidizing gases G is formed integrally with the base 29a and receives a supply of inert gas, preferably a helium gas (He) of predetermined pressure. The helium gas is ejected from the nozzle 29F through the base 29a, intermediate portion 29b and forward end portion 29c against the point to be welded. The stream of helium gas ejected from the nozzle 29F has the effects of cooling the beam guide 29 and blowing dust out of the beam guide 29 while preventing dust from being introduced thereinto. Helium has an ionization potential of 24.6 V which is higher than the ionization potential of argon (Ar) which is 15.76 V, so that helium inhibits the production of plasma by the laser beam LB radiated substantially coaxially with the helium gas and minimizes the absorption of the energy of the beam. The helium gas flows from the nozzle 29F toward the point to be welded along the path of travel of the laser beam LB, so that it covers the opposed edges 2, before being welded, of tubular shape 1 and the point to be welded to avoid oxidization of the welded point. Since the helium gas flows constantly at all times, the distribution of temperature in the path of travel of the laser beam LB between the nozzle 29F and welded point becomes uniform. Thus, no deflection of the laser beam LB occurs and the beam can be directed to any position as desired.

The operation of the movie guide 29 described hereinabove is summarized as follows:

1. Adjustments of the beam projection profile.
2. Prevention of collection of dust in the optical system including mirrors, lens, etc.
3. Multiple reflection effect achieved by the laser beam at the opposed edges of the tubular shape before being welded by preventing oxidization of the edges.
4. Removal of dust and moisture from the path of travel of the laser beam and reduced loss in power.

Although not shown, the beam guide 29 is provided with means for controlling the position of the beam guide in the directions $AD_1$ to $AD_4$, so that the position against which the laser beam is directed and the beam projection profile can be set and adjusted as follows:

1. Adjustments of the position of the beam in the direction of welding ($AD_1$) (X-axis).
2. Adjustments of the position of the beam in the horizontal direction ($AD_2$) (Y-axis).
3. Adjustments of the position of the beam in the vertical direction ($AD_3$) (Z-axis).
4. Adjustments of the projection pattern ($AD_4$) (Adjustments of distances of $LB_1$ and $LB_2$ in the X-axis direction: adjustments of overlapping).

The control of the beam position in three directions and the control of the beam projection pattern summarized hereinabove will be described in detail by referring to FIG. 7.

1. Control of the Beam Position in the Direction of Welding (X-axis)

In this control, the position of the focus and the position of the nozzle at the forward end of the guide are adjusted. The intermediate portion 29b is adjusted in the directions of $AD_1$ with respect to the base 29a. The intermediate portion 29b (mirror $M_1$) and the forward end portion 29c (mirror $M_2$) move as a unit with respect to the base 29a, so that the position of the nozzle 29F can be adjusted. When the transmitting mirrors $M_1$ and $M_2$ are mirrors having a curvature, the distances between the focusing lens FL and the mirrors $M_1$ and $M_2$ undergo changes, so that the characteristic of the composite focusing system (the beam image at the projected point) undergoes changes. That is, the position of the focus of the beam and the position of the focusing system (the image of the beam at the projected point) undergo changes. Thus, it is possible to control the profile and position of the beam with respect to the irradiated position, and consequently the profile of the beam oriented in the direction of thickness of the tubular shape 1 can be controlled, thereby enabling control of the shape of the melt to be effected.

2. Control of the Laser Beam in the Horizontal Direction (Y-axis)

By rotating the forward end portion 29c relative to the intermediate portion 29b, the mirror $M_2$ (at the forward end portion 29c) can be moved about the mirror $M_1$, so that it is possible to adjust in the horizontal direction the position against which the laser beam is projected after being reflected by these mirrors at their centers. As a result, it is possible to avoid non-uniform melting of one of the opposed edges 2 to be welded.

3. Control of the Laser Beam in the Vertical Direction (X-axis)

By moving the forward end portion 29c upwardly and downwardly in the directions of the arrows $AD_3$, it is possible to control the vertical movement of the laser beam to move same to the center of the thickness of the tubular shape and to move same in accordance with the distribution of heat generated by electrical resistance welding.

4. Control of the Laser Beam to Cope with Changes in Thickness

It is necessary that the position against which the laser beam is projected be varied in accordance with changes, variations or fluctuations in the thickness of the steel strip from which the tubular shape 1 is formed. This is necessary because an increase in the thickness of the steel strip causes, if it is made when the bottom surface of the steel strip remains stationary, its top surface (and the center of its thickness) to move upwardly, thereby making it necessary to move upwardly the position against which the laser beam is projected. When the thickness is varied, the forward end portion 29c is moved vertically in the directions of arrows $AD_3$ to bring the position against which the laser beam is projected into coincidence with the center of thickness. A change in the length of the path of beam resulting from this control of the laser beam is cancelled out by moving the intermediate portion 29b in the $AD_1$ directions.

5. The point of intersection of $LB_1$ and $LB_2$ in $Lb=LB_x=LB_1+LB_2$ is disposed substantially at the point to be welded. By moving the base 29a in the $AD_4$ directions, it is possible to move the point of intersection forwardly and rearwardly of the point to be welded, thereby causing a change to occur in the length of the overlap of $LB_1$ and $LB_2$. Thus, the length of the overlap can be set by moving the base 29a in the $AD_4$ directions (setting the projection pattern).

The operations performed by the height sensor 15 and beam position and profile sensor 22 will now be described.

The height sensor 15 may be in the form of a differential transducer which generates a signal indicating a displacement of the top surface of the tubular shape 1 from a reference surface set beforehand. This signal is inputted to the processor/controller 11. The beam position and profile sensor 22 which is inserted in the path of travel of the laser beam LB when sampling of measurements is performed to obtain video data on the position to be heated and the profile of the beam supplies a video signal to the video analyzer 23 which digitizes the video signal and supplies image data on the profile of a hole through which the beam passes to the processor/controller 11. At the same time, the processor/controller 11 supplies to the CRT display unit 24 position data indicating the center coordinates of the hole for the beam to pass through to the processor/controller 11 which produces image data on the profile of the portion to be heated (image data indicating the actual position and actual profile of the laser beam), image data indicating the positions of the top and bottom surfaces of the tubular shape 1 and the position against which the laser beam is to be projected obtained by calculation from the data inputted at the time the system was set for operations (image data indicating the profile of the groove and the position against which the laser beam is to be projected obtained by calculation from initial target data) and image data on the overlap of actual positions of the top and bottom surfaces of the tubular shape 1 obtained by calculation from the center deviation $\Delta C$ from the arithmetic unit 14, the height data from the height sensor 15 and the thickness data from the thickness sensor 16. At the same time, the processor/controller 11 recalculates pressure data, high-frequency power and the profile and power of the laser beam based on the measurements actually obtained by the arithmetic unit 14, speedometer 21, height sensor 15, thickness sensor 16 and camera 22 and makes alternations to the commands given to the optical system controller 17 and laser controller 18 is synchronism with the progress of the welding operation. When the welding operation is commenced, the processor/controller 11 calculates the target values and supplies same to the sections concerned as described hereinabove. However, after the welding operation has been started, the processor/controller 11 monitors the welding operation based on the values actually measured by the sensors and performs feedback control to optimize the condition in which welding is performed.

The CRT display unit 25 indicates the condition in which welding is performed (the melting of the butted opposed edges) and shows the groove as viewed from above together with the target center line of the groove set initially (dotted line) and the position in which the melt is measured (vertical solid line). The CRT display unit 24 indicates the actual position of the top surface of the tubular shape 1 (horizontal solid line), the actual position of the bottom surface of the tubular shape 1 (horizontal solid line), the actual center of the groove (the point to be welded which is the vertex of the wedge indicated by a vertical solid line) and the actual position against which the laser beam is projected and the profile of the beam (a circular hatched area indicated by solid lines) together with the position of the top surface of the tubular shape 1 (horizontal dotted line), the position of the bottom surface of the tubular shape 1 (horizontal dotted line), the center of the groove (vertical dotted line), the position against which the laser beam is projected and the profile of the beam (a circular area defined by a dotted line) which have been set initially. The operator can obtain information on the condition in which welding is being performed from the panels of the CRT display units 24 and 25 and compare the actual condition in which welding is performed with the condition set initially for performing welding. The processor/controller 11 is capable of inputting renewed conditions for welding to alter or correct the condition in which welding is performed, to cope with the actual condition in which welding is performed.

Means for sensing the position and profile of the laser beam LB may comprise optical sensor elements arranged two-dimensionally. The sensors may be in the form of thermocouples. Sensors of other known type may be used as the height sensor 15 and thickness sensor 16.

Referring to FIG. 1 again, the pattern of the laser beam LB and the distribution of its power are set in accordance with the plate thickness, welding speed and other welding conditions by the processor/controller 11. Means for adjusting the beam guide 29 is controlled in accordance with the pattern of the laser beam LB by the optical system controller 17 to set the position against which the beam is projected (the range of over 30% and below 80% of the thickness including its center) and the image of the projected beam. Then, the beam generating power is set. As a result, welding can be performed with a uniform melting in the direction of the thickness, so that the weld produced is free from defects, high in toughness and minimized in heat-affected zone. Since welding is performed while the actual welding conditions are being monitored, the results obtained are as originally designed.

When the weld point is heated by the laser beam, the laser beam is projected in a horizontal direction against the groove formed by the edges of the cylindrical shape in the form of a wedge. However, it is not essential that the laser beam be projected in the horizontal direction and the beam may be directed obliquely as long as such projection is practically performable. The laser beam projected against the point to be welded need not necessarily be a fine beam focused at the point to be welded but it may be a thick beam. Such beam of large dimension may be projected in such a manner that it is directed against portions of the opposed edges of the groove located anterior to the vertex of the edge and moved from one edge to the opposite edge so that the intensity of energy in the space surrounded by the walls of the wedge-shaped groove increases as the laser beam is repeatedly reflected by the opposed edges, until the vertex of the wedge (point to be welded) is heated and melted. The laser beam may be made to scan in the direction of the thickness. The laser unit used in the method according to the invention may comprise a plurality of laser beam generators.

EXAMPLE 1

Figure 8A:
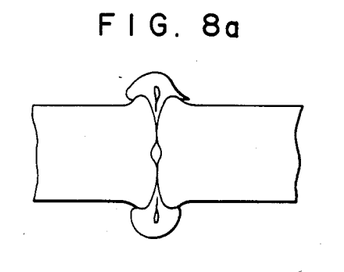
FIGS. 8a, 8b and 8c are sectional views of a weld produced by the high-frequency current while a laser beam is applied to the weld, in which the laser beam diameters are set at 0.25 t, 0.3–0.8 t and 0.9 t (wherein t is the thickness of the plate), respectively.
Figure 8B:
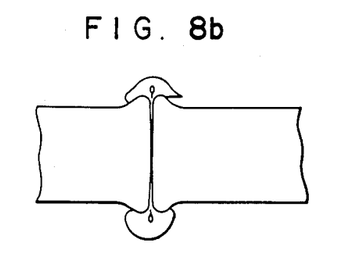
Figure 8C:
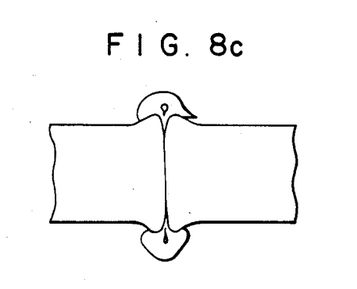

A metal strip of a plate thickness t of 12.7 mm was welded under the welding conditions including a laser . . . 5 KW, a high-frequency current . . . 270 KW, a welding speed . . . 12 m/min and a metal flow angle . . . 35 degrees, by varying the diameter of the laser beam as follows:

(a) The diameter of laser beam . . . 0.25 t
(b) The diameter of laser beam . . . 0.3 to 0.8 t
(c) The diameter of laser beam . . . 0.9 t The following results were obtained. When the diameter of the laser beam was 0.25 t, a hole was formed in the central portion of the plate thickness where overmelting occurred, and shrinkage cavities were formed in the corners, as shown in FIG. 8a. The overmelting in the central portion and the shrinkage cavities in the corners were responsible for weld defect. When the diameter of the laser beam was 0.3-0.8 t, melting occurred uniformly in the direction of the plate thickness and the shrinkage cavities were located outside the range of plate thickness, as shown in FIG. 8b. The weld was free from defects and the deformation of the heat-affected zone was minimized. When the diameter of the laser beam was 0.9 t, heating efficiency was low and the central portion was insufficiently melted, causing a cold weld to be produced as shown in FIG. 8c.

Figure 9:
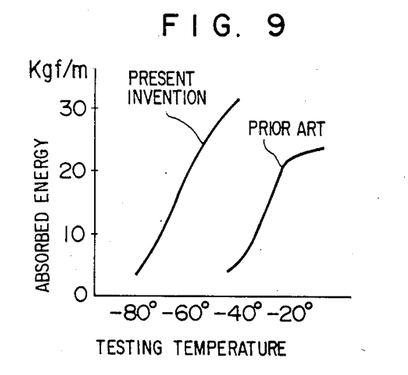
FIG. 9 is a graph showing the results of tests conducted on the specimens of the weld to determine its toughness.

FIG. 9 shows the results of toughness tests. In the figure, the result shown as being obtained by the method according to the invention was obtained by using specimens produced by using the laser beam of the diameter 0.3-0.8 t, and the result shown as being obtained by the method of the prior art was obtained by using the specimen shown in FIG. 5c.

EXAMPLE 2

Electric resistance welded tubes (outer diameter, 406 mm; and thickness, 16 mm) were produced from a strip of steel (API 51X-X70) by using a high-frequency electric resistance welding method of the prior art and the high-frequency electric resistance welding method combined with the irradiation of a laser beam according to the invention. The power of the high-frequency electric resistance welding machine and the rated generating power of the laser beam generator were 800 KW and 15 KW respectively in the experiments. The laser beam irradiation was performed under conditions C and D. In condition C, the surface of the workpiece to be irradiated was 50% of the thickness with the center of the thickness located in the center of the surface to be irradiated, and in condition D, the corresponding surface area was 80%. The melt Wh was measured in the position midway between the melting initiating position and the vertex of the wedge by means of the video camera 12 and video analyzer 23. The melt $Wh_o$ produced widthwise of the workpiece and the melt $Wv_o$ produced thicknesswise of the workpiece at the vertex of the wedge were calculated by the processor/controller 11 (see FIG. 6). The results of preliminary experiments show that the most approximately uniform melting was achieved when Wh=0.8 mm and the welding speed was 18 m/min in condition C and when Wh=0.5 mm and the welding speed was 14 m/min in condition D. Thus, the high-frequency power controller was set to control the power of the high-frequency electric resistance welding machine in such a manner that the values of Wh become 0.8 mm and 0.5 mm in conditions C and D respectively.

The upset was 1.5 mm in the method according to the invention, and the metal flow rising angle was about 30 degrees. In the method of the prior art, the optimum upset was set at 4.3 mm (condition A), and the value of 1.5 mm (condition B) was set as a control. As regards the heat input for the high-frequency electric resistance welding, conditions for minimizing the production of weld defects were determined by preliminary experiments, and the heat input was accordingly set at a suitable value.

After the welding operation was finished, the outer surface of the weld was annealed at 1000° C. by a seam heat-treating device. 2 mm charpy impact test specimens were obtained from the welds of the steel tubes produced in the experiments, and tests were conducted for comparing them with each other with regard to toughness. Table 1 shows the relation between the welding conditions and toughness.

TABLE 1

| Welding condition | High-Frequency Input (kw) | Laser Input (kw) | Welding Speed (m/min) | Upset (mm) | vE-20 (Kgf · m) | vTrs (°C.) |
| --- | --- | --- | --- | --- | --- | --- |
| A | 740 | 0 | 18 | 4.3 | 7.5 | −18 |
| B | 793 | 0 | 18 | 1.5 | 3.2 | 7 |
| C | 612 | 15 | 18 | 1.5 | 35.8 | −62 |
| D | 548 | 15 | 14 | 1.5 | 37.9 | −61 |

From the foregoing description, it will be appreciated that it is possible to produce welds of high toughness as shown in FIG. 9 by the method according to the invention. The welds produced are such that they have a small and uniform depth in the direction of the thickness of the workpiece and no weld defects are produced. The deformation of the heat-affected zone is minimized, and the metal flow rising angle is small. Thus, the welds produced serve as joints of high performance, and the method according to the invention can have application not only in producing electric resistance welded tubes but also in performing various types of butt welding.

What is claimed is:

1. A high-frequency electric resistance welding method combined with the irradiation of a laser beam, comprising the steps of:

continuously feeding a workpiece and forming opposed edges thereof into a wedge shape by causing them to converge as they are butted against each other;

heating the butted opposed edges with a high-frequency electric current; and presetting a position for a laser beam to be projected against the vertex of the butted edges of the wedge shape at the level being in a range of from above 30% and below 80% of the thickness of the butted edges at the workpiece including a central position of the thickness;

projecting a laser beam against the vertex of the butted edges of the wedge shape from its open side at said predetermined level of said thickness, to thereby heat the vertex of the butted edges of the wedge shape to a welding temperature;

whereby the butted edges of the workpiece are uniformly heated through the entire range of said thickness.

2. A high-frequency electric resistance welding method combined with the irradiation with a laser beam as claimed in claim 1, wherein as small an upset as possible is produced when welding is effected by continuously feeding the workpiece and forming the opposed edges thereof into the wedge shape by causing them to converge as they are butted against each other, the central portion of the thickness of the butted edges of the workpiece is irradiated with a laser beam of cross-sectional beam profile and energy distribution capable of melting the butted edges widely in the direction of thickness while minimizing the depth to obtain the desired upset depending on the welding speed, the physical properties of the workpiece and the power of the laser beam, while the corner portions of the butted edges of the workpiece are heated by Joule heat produced by the high-frequency electric current.

3. A high-frequency electric resistance welding method combined with the irradiation of a laser beam as claimed in claim 1, wherein an upsetting force is exerted on the workpiece in such a manner that a metal flow rising angle of a heat-affected zone becomes below 40 degrees.

4. A high-frequency electric resistance welding method combined with the irradiation of a laser beam as claimed in claim 1, wherein a position sensor and a thickness sensor are located at the butted edges to monitor the position of the butted edges and the thickness of the workpiece respectively, and the position of the laser beam projected against the butted edges of the wedge shape is monitored, so as to bring the center of the laser beam into coincidence with a predetermined position in the thickness of the butted edges based on information obtained by monitoring.

5. A high-frequency electric resistance welding method combined with the irradiation of a laser beam as claimed in claim 1, wherein a melting in the corners of the butted edges is measured and at least one of the power of the laser beam projected against the butted edges, the power distribution in the point against which the laser beam is projected and the high-frequency current is controlled based on the measurement of the melt.

* * * * *